United States Patent
Egi et al.

(10) Patent No.: US 9,838,308 B2
(45) Date of Patent: Dec. 5, 2017

(54) IMPROVING THE ARCHITECTURE OF MIDDLEBOXES OR SERVICE ROUTERS TO BETTER CONSOLIDATE DIVERSE FUNCTIONS

(71) Applicant: Futurewei Technologies, Inc., Plano, TX (US)

(72) Inventors: Norbert Egi, Santa Clara, CA (US); Guangyu Shi, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 254 days.

(21) Appl. No.: 13/729,415

(22) Filed: Dec. 28, 2012

(65) Prior Publication Data

US 2013/0170501 A1 Jul. 4, 2013

Related U.S. Application Data

(60) Provisional application No. 61/581,008, filed on Dec. 28, 2011.

(51) Int. Cl.
 *H04L 12/56* (2006.01)
 *H04L 12/773* (2013.01)
 (Continued)

(52) U.S. Cl.
 CPC .......... *H04L 45/60* (2013.01); *H04L 47/2441* (2013.01); *H04L 47/621* (2013.01); *H04L 47/6255* (2013.01); *H04L 2012/6489* (2013.01)

(58) Field of Classification Search
 CPC ... H04L 45/60; H04L 47/2441; H04L 47/621; H04L 47/6255; H04L 12/5693; H04L 2012/6489
 (Continued)

(56) References Cited

U.S. PATENT DOCUMENTS

| 2003/0123388 A1* | 7/2003 | Bradd ................. H04L 12/5695 370/230 |
| 2004/0028062 A1 | 2/2004 | Pirhonen et al. |

(Continued)

FOREIGN PATENT DOCUMENTS

| CN | 1898917 A | 1/2007 |
| EP | 1315359 | * 9/2002 |

(Continued)

OTHER PUBLICATIONS

Eriksson, A., et al., "A Middlebox Control Plane Framework for Wireless and Mobile IP Networks," ICPP 2004 Workshops Proceedings, Aug. 15-18, 2004, pp. 322-329.

(Continued)

*Primary Examiner* — Ian N Moore
*Assistant Examiner* — Mewale Ambaye
(74) *Attorney, Agent, or Firm* — Conley Rose, P.C.

(57) ABSTRACT

An apparatus comprising at least one receiver configured to receive a traffic flow, receive information comprising a set of functions and an order of the set from a controller, and a processor coupled to the at least one receiver and configured to assign the traffic flow to one or more resources, determine a processing schedule for the traffic flow, and process the traffic flow by the set of functions, following the order of the set, using the one or more resources, and according to the processing schedule.

13 Claims, 4 Drawing Sheets

(51) Int. Cl.
*H04L 12/851* (2013.01)
*H04L 12/64* (2006.01)
*H04L 12/863* (2013.01)

(58) Field of Classification Search
USPC .......................................................... 370/401
See application file for complete search history.

(56) References Cited

U.S. PATENT DOCUMENTS

| | | | |
|---|---|---|---|
| 2004/0267948 A1* | 12/2004 | Oliver | H04L 12/5693 709/230 |
| 2005/0052997 A1* | 3/2005 | Montes Linares | H04L 12/5693 370/230 |
| 2007/0220294 A1* | 9/2007 | Lippett | 713/320 |
| 2007/0286185 A1 | 12/2007 | Eriksson et al. | |
| 2009/0080451 A1* | 3/2009 | Gogic | H04L 12/5695 370/412 |
| 2009/0247174 A1 | 10/2009 | Zhang et al. | |
| 2010/0046530 A1 | 2/2010 | Hautakorpi et al. | |
| 2011/0063975 A1* | 3/2011 | Ohseki | H04W 72/1257 370/230.1 |
| 2011/0307233 A1* | 12/2011 | Tseng | G06F 17/5022 703/14 |

FOREIGN PATENT DOCUMENTS

| | | |
|---|---|---|
| EP | 1315359 A2 | 5/2003 |
| WO | 2005062558 A1 | 7/2005 |
| WO | WO2005/062558 * | 7/2005 |

OTHER PUBLICATIONS

Stiemerling, M., et al., "Simple Middlebox Configuration (SIMCO) Protocol Version 2.0," draft-stiemerling-midcom-simco-03.txt, Feb. 1, 2003, 21 pages.
Srisuresh, P., et al., "Middlebox Communication Architecture and Framework," RFC3303, Aug. 1, 2002, 35 pages.
Swale, R., et al., "Middlebox Communication (midcom) Protocol Requirements," RFC 3304, Aug. 2002, 10 pages.
Foreign Communication From a Counterpart Application, PCT Application PCT/SE2004/000265, International Search Report dated Jan. 10, 2004, 2 pages.
Foreign Communication From a Counterpart Application, PCT Application PCT/US2012/071956, International Search Report dated Apr. 12, 2013, 5 pages.
Foreign Communication From a Counterpart Application, PCT Application PCT/US2012/071956, Written Opinion dated Apr. 12, 2013, 10 pages.
Greenhalgh, et al., "Flow Processing and the Rise of Commodity Network Hardware," ACM SIGCOMM Computer Communication Review, vol. 39, No. 2, Apr. 2009, pp. 21-26.
Sekar, et al., "The Middlebox Manifesto: Enabling Innovation in Middlebox Deployment," Hotnets '11, Nov. 14-15, 2001, Cambridge, MA, 6 pages.
Foreign Communication From a Counterpart Application, Chinese Application No. 201280063856.2, Chinese Search Report dated Feb. 24, 2016, 2 pages.
Foreign Communication From a Counterpart Application, Chinese Application No. 201280063856.2, Chinese Office Action dated Mar. 3, 2016, 6 pages.

* cited by examiner

IMPROVING THE ARCHITECTURE OF MIDDLEBOXES OR SERVICE ROUTERS TO BETTER CONSOLIDATE DIVERSE FUNCTIONS

CROSS-REFERENCE TO RELATED APPLICATIONS

The present application claims priority to U.S. Provisional Patent Application No. 61/581,008 filed Dec. 28, 2011, by Norbert Egi et al. and entitled "A Service Router Architecture", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern networks often deploy a range of middleboxes, which are network appliances configured to perform a variety of services or functions. Exemplary middleboxes include wide area network (WAN) optimizers, proxies, caches, intrusion detection systems (IDS), intrusion prevention systems, network-level and application-level firewalls, application-specific gateways, and load-balancers. A service router may be considered a middlebox that performs not only forwarding or routing functions like a switch or a router, but also additional higher-value functions or network applications, such as packet tagging, firewall, intrusion detection/prevention, encryption, load-balancing, and WAN acceleration. According to several studies reporting on the rapid growth of middlebox deployment, the middlebox market for network security appliances alone was estimated to be 6 billion dollars in 2010, and expected to rise to 10 billion in 2016. In today's networks, a number of middleboxes may be comparable to a number of routers. Thus, middleboxes have become an important part of modern networks, and it is reasonable to expect that they will remain so for the foreseeable future. Middleboxes may be vital parts in various networks, such as enterprise, internet service provider (ISP), and datacenter networks.

However, today's middleboxes may be expensive and closed systems, with little or no hooks and application programming interfaces (APIs) for extension or experimentation of functionalities. Each middlebox may be built on a particular choice of hardware platform, and may support only a narrow specialized function (e.g., intrusion detection or WAN optimization). Further, different middleboxes may be acquired from independent vendors and deployed as standalone devices with little uniformity in their management APIs. Thus, it may be desirable to improve the architecture of middleboxes or service routers to better consolidate diverse functions.

SUMMARY

In one embodiment, the disclosure includes an apparatus comprising at least one receiver configured to receive a traffic flow, receive information comprising a set of functions and an order of the set from a controller, and a processor coupled to the at least one receiver and configured to assign the traffic flow to one or more resources, determine a processing schedule for the traffic flow, and process the traffic flow by the set of functions, following the order of the set, using the one or more resources, and according to the processing schedule.

In another embodiment, the disclosure includes a method comprising receiving a traffic flow and configuration information, wherein the configuration information comprises a set of functions and an order of the set, assigning the traffic flow to one or more resources, determining a processing schedule for the traffic flow, and processing the traffic flow by the set of functions, following the order of the set, using the one or more resources, and according to the processing schedule.

In yet another embodiment, the disclosure includes a middlebox comprising at least one receiver configured to receive a plurality of packets from a network source, receive information comprising a set of functions and an order of the set of functions from a controller, and a processor implementing a local coordinator, wherein the local coordinator is configured to compute a sum of resource needed for the plurality of packets based on the set of functions, allocate at least one hardware resource based on the sum, determine a processing schedule, and process the plurality of packets by the set of functions, following the order of the set, using the at least one hardware resource, and according to the processing schedule.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are apparatuses, systems, and methods for consolidating a plurality of network applications on a shared hardware platform of a middlebox. In a disclosed packet processing scheme, at least two different types of functions are incorporated into a middlebox. After the middlebox receives traffic flows from network sources and configuration information from a network-wide controller, a policy enforcement layer (PEL) located in the middlebox may allocate functions and resources for the received traffic flows. The configuration information may specify a traffic class of each flow, a set of functions to be used in processing the traffic flows, and applicable resource constraints. In an embodiment, the PEL may assign instances of functions to one or more resources and assign a traffic flow to the instance of functions. The PEL may have input information regarding all resources, functions, and traffic flows, so that the PEL may ensure no resource is overloaded with processing tasks. This disclosure may address resource management and implementation challenges that arise in exploiting the benefits of consolidation in middlebox deployments. This architecture may enable extensibility of functionalities or network services with increased flexibility.

Figure 1:
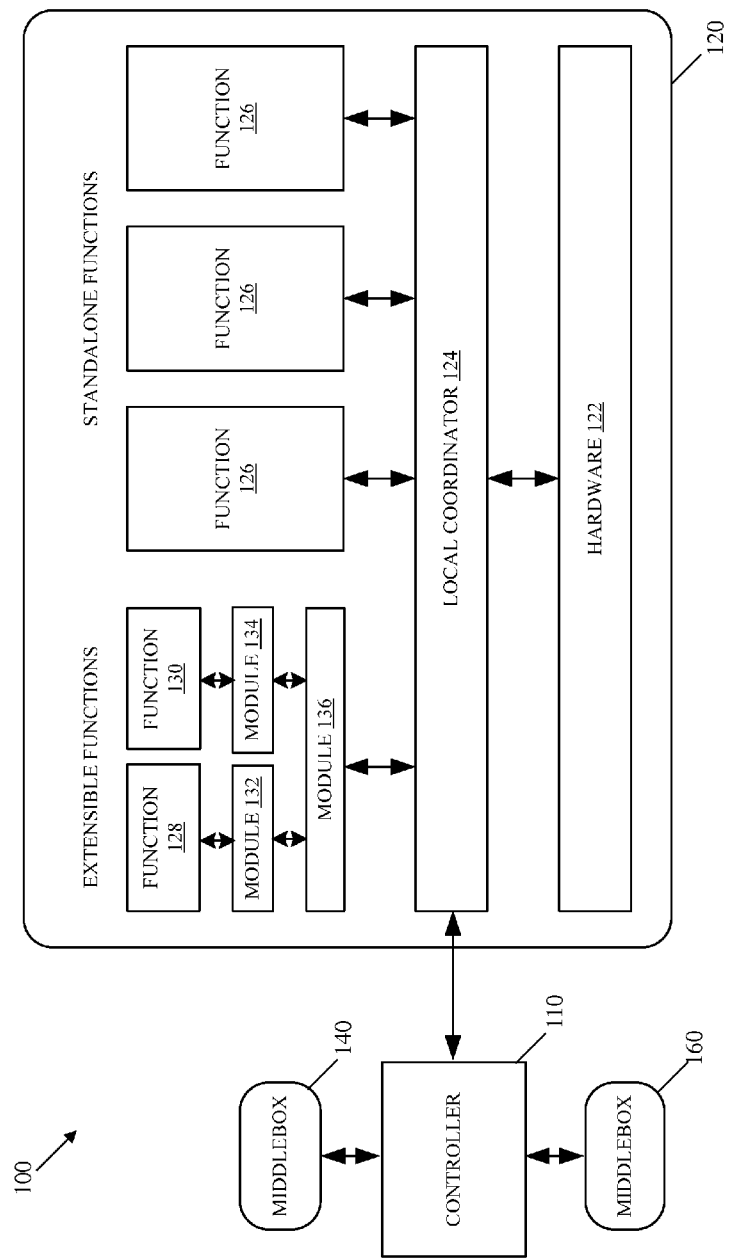
FIG. 1 is a schematic diagram of an embodiment of a simplified network architecture.

FIG. 1 illustrates an embodiment of a simplified network architecture 100 comprising a controller 110 and a plurality of network components or nodes, such as middleboxes 120, 140, and 160. Each middlebox may be configured to provide the same function or different functions. If the function(s) of a middlebox includes routing, the middlebox may also be interchangeably referred to as a service router. The controller 110 may be a centralized device or entity located in, e.g., a datacenter of a network, and may control all middleboxes across the network to achieve network-wide objectives. Alternatively, the controller 110 may be one of multiple controllers that are distributed within the network, with each distributed controller responsible for managing a portion of the middleboxes. In this case, the network architecture 100 may represent only a portion of an entire network.

The controller 110 may be utilized to solve an optimization problem that determines how traffic flows should be split across middleboxes to minimize network-wide resource consumption, while respecting resource limits and policy requirements of each middlebox. Accordingly, the controller 110 may determine how traffic flows from a network source (e.g., the Internet) should be processed by the middleboxes. In overseeing a network, the controller 110 may receive various inputs, such as information about the network (e.g., topology, services available at network nodes), a traffic workload, a description of hardware resources in each middlebox, and/or a policy specification that describes network-wide objectives and constraints of network applications. The controller 110 may analyze the inputs and produce an output, which may be a set of per-middlebox or per-router configurations. In an embodiment, the output may be in the form of a table comprising three columns or rows. For example, a first column may contain traffic flow identifications (IDs), which may be in any form that enables packet classification and selection of packets belonging to a specified flow. For instance, a flow ID may be a 5-tuple of an Internet protocol (IP) packet, where the 5-tuple comprises a source IP address, a destination IP address, a source port number, a destination port number, and a protocol in use. For another instance, the flow ID may be a bitmap matched against the header(s) and/or the payload of the packets. In addition, a second column of the output may contain a set of services to be executed on the traffic flow and an order of the services. A third column of the output may contain resource constraints, which may be in the form of throughput and/or latency limitations, or amount of resources (e.g., processor, memory, input, and output) that can be used to process the traffic flow.

The output of the controller 110 may be considered an assignment of processing responsibilities to each middlebox. For a target middlebox, such as the middlebox 120, the controller 110 may specify what traffic class or classes are to be processed by the middlebox 120 and a flow volume in each traffic class. The flow volume may be expressed as a fraction of a total flow volume received by the network 100. For example, if the network 100 receives a traffic flow that is too large for one middlebox to process, the controller 110 may assign the traffic flow to be processed by 10 middleboxes, each taking a 1/10 fraction. In an embodiment, the assignment information may be described by a set of (traffic class, fraction) pairs. In addition, the output of the controller 110 may specify one or more functions or services associated with each traffic class as well as an execution order that the one or more functions follow.

In describing working principles of middleboxes, the middlebox 120 will be used as a representative example. The middlebox 120 may be configured to receive traffic flows from a network source (e.g., the Internet). A traffic flow may comprise a plurality of packets, each of which is a formatted unit of data supported by the network. A traffic flow may be a sequence of packets that are identified by the same parameters typically residing in the header of the packets, such as source and destination IP addresses, ports, and protocol numbers. Further, the middlebox 120 may be configured to receive the output of the controller 110, which contains information regarding how to process the traffic flows. Then, the middlebox 120 may process the traffic flows according to configurations determined by the controller 110.

As shown in FIG. 1, the middlebox 120 comprises a hardware platform 122, a number of functions and modules, and a local coordinator 124 in between. The hardware platform 122 may comprise any appropriate type of hardware, such as processor or central processing unit (CPU), memory, disk, screen or display, input/output device, network bandwidth or capacity, or any combination thereof. The local coordinator 124 may consolidate the functions and modules, which may be implemented as software, on the shared hardware platform 122.

A function or network application incorporated in the middlebox 120 may be categorized as a standalone function or an extensible function. For illustrative purposes, three standalone functions 126 as well as two extensible functions 128 and 130 are shown in FIG. 1. Nevertheless, it should be understood that, depending on the application, any number and/or type of functions may be incorporated in the middlebox 120. The standalone functions 126 may neither depend on nor need any information from another function or module. For example, in the case of a standalone function 126 being a firewall, the firewall may process a packet, e.g., filtering it through an access control unit, without needing any information from another function or module. Further, any two standalone functions may perform the same or different services. On the other hand, each extensible function may depend on or use information from other module(s) in order to process a packet. In an embodiment, the extensible function 128 may be built on top of a module 132, and the extensible function 130 on a module 134. For example, the module 132 may be a packet merger configured to buffer all received packets. After the last packet of a desired traffic flow is received by the module 132, all packets may be merged and forwarded to the extensible function 128 (e.g., an intrusion detection system).

Further, as shown in FIG. 1, the modules 132 and 134 may be built on another module 136, which may implement a common function that is used by both the modules 132 and 134. The modules 132, 134, and 136 (sometimes referred to as sub-functions) may perform some basic packet processing (e.g., splitting or merging of packets), so that they may assist other functions. Note that the extensible functions 126 and 128 may also be built directly on the module 136 (i.e., without the modules 132 and 134). A common function or sub-function may be shared by other different functions (e.g. encryption or decryption, and transmission control protocol (TCP) offloading or coalescing). For example, the module 136 may be a port control protocol (PCP) upload engine that is shared by a hypertext transfer protocol (HTTP) service (i.e., the extensible function 126) and a file transfer protocol (FTP) service (i.e., the extensible function 128). Thus, the common sub-function may be executed by a single module (e.g., the module 136) accessed by multiple functions or modules applications. This implementation may improve processing efficiency and reduce resource footprint, compared to a case in which every function runs a separate instance of the common sub-function.

To process a traffic flow comprising multiple packets, the functions 126, 128, and 130 may be implemented to perform any type of functionality or service, such as packet tagging, forwarding, and routing, firewall, intrusion detection/prevention, encryption, load-balancing, and WAN acceleration. In an embodiment, at least two different types of functions are incorporated inside the middlebox 120.

In an embodiment, the local coordinator 124 may be configured to remotely interact with the network-wide controller 110, e.g., via a receiver. Thus, for a traffic flow comprising a plurality of packets, the local coordinator 124 may obtain from the output of the controller 110 configuration information, such as a flow ID, a set and order of functions, and resource constraints. Based on this information, the local coordinator 124 may perform various tasks. As a first task, if the packets need to be processed by multiple functions with a partial precedence order between them, the local coordinator 124 may steer or direct packets from one function to another based on the execution order. Since different functions may have been obtained from different vendors, they may be unaware of each other, thus the local coordinator 124 is responsible for steering a packet and any intermediate processing result between functions. Eventually, after the packets are processed by functions in the set of functions, the local coordinator 124 may forward or route the packets to another network node (e.g., a middlebox, a router, or a server). As a second task, to efficiently multiplex different functions on the shared hardware platform 122, the local coordinator 124 may allocate hardware/software resource(s) to the set of functions, and determine the schedule of allocation. For example, the local coordinator 124 may check how much resource is being used by a particular function. In case the function is exceeding its allocated resources, its execution may be pre-empted or slowed down.

Based on above descriptions, the middlebox 120 may be considered a modular system architecture that consolidates different network functionalities in a single hardware platform. In implementation, the middlebox 120 may be a commodity computer system or server system. In addition to software, the middlebox 120 may include hardware accelerators, such as one or more global processing units (GPUs) or field-programmable gate arrays (FPGAs). Alternatively, the middlebox 120 may be fully hardware-based, e.g., developed in an application-specific integrated circuit (ASIC). In different stages of product development, there may be different way to implement functions and modules. For example, a function may be first implemented by software, then re-implemented by FPGA after experimental testing, and eventually re-implemented by ASIC after the function is confirmed to be fully functional.

Figure 2:
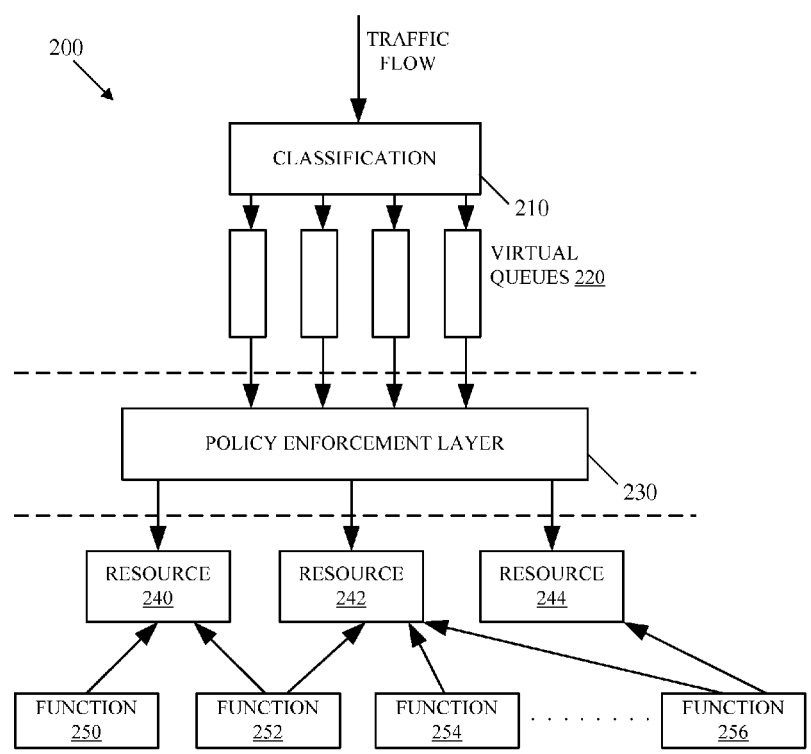
FIG. 2 is a schematic diagram of an embodiment of a packet processing scheme.

FIG. 2 illustrates an embodiment of a packet processing scheme 200 implemented by a middlebox (e.g., the middlebox 120). In particular, a local coordinator (e.g., the local coordinator 124) may be configured to implement a classification module 210, a number of virtual queues 220, and a policy enforcement layer (PEL) 230. The local coordinator may be further configured to allocate and schedule resources 240, 242, and 244 to functions 250, 252, 254, and 256. It should be understood that FIG. 2 merely serves an illustrative example of a packet processing scheme, and that depending on the application, any other number of virtual queues, resources, and functions may be used within the scope of this disclosure. The scheme 200 may be understood to be a logical view of a middlebox.

In an embodiment, an incoming traffic flow comprising a plurality of packets may first be classified by a classification module 210 to identify what traffic class the packets belong to. There may be various approaches to define traffic classes, and exemplary traffic classes may include delay-sensitive traffic, best-effort traffic, undesired traffic, or traffic destined to be processed by a given set of functionalities in a specified or unspecified order. As mentioned previously, aside from the traffic flow, a flow ID (e.g., a bitmap) may also be received from a controller. Thus, the flow ID may be used to determine which traffic class the traffic flow belongs to. Packet classification may be implemented to occur in a network interface card receiving the packets, or in software or a special hardware accelerator inside the middlebox, or at a switch in a front-end of the middlebox.

After classification, the traffic flow may be presented to the PEL 230 in a virtual queue. There may be a plurality of virtual queues, each corresponding to one traffic class. The PEL 230 may have information about how much resource and bandwidth is assigned to each traffic class, which functions to use for each traffic class, and how much resources each function is assigned. Thus, the PEL 230 may be responsible for steering or directing the packets between the different functions and in the appropriate order, if multiple functions are required to process the packets. In doing so, the PEL 230 may steer packets only to those function(s) which have resources left. Then, the packets may be processed by the designated function(s). Depending on its traffic class, the traffic flow may be processed by different functions and/or resources (determined by the controller).

Any of the functions 250, 252, 254, and 256 may be a standalone or an extensible function. Different functions may use the same resource or different resources. For example, as shown in FIG. 2, the functions 250 and 252 may use the resource 240, while the function 256 may use the resources 242 and 244. Any of the resources 240, 242, and 244 may refer to any hardware and/or software resource. Exemplary hardware resources include, but are not limited to, CPU, memory, disk, screen or display, input/output device, network bandwidth, and combinations thereof. Exemplary software resources include, but are not limited to, web page, media content, newsgroup content, file, software object, database, access control list, and combinations thereof.

The packet processing scheme 200 may be used in a virtualized network architecture, wherein each traffic class may be treated as a virtual network and processed separately and independently. In this case, functions for each traffic class may also be implemented individually.

In order to consolidate multiple functions for different incoming traffic flows, the PEL 230 may obtain various input information, which allows it to determine which flows should be executed by which processes, set the affinity between processes and resources, schedule processes in the right time and order, and ensure that the resource guarantees are met. Exemplary input information of the PEL include, but are not limited to, the following:

Traffic flows to be processed by the middlebox. The traffic flows may be denoted as F in the form of $\{F_0, F_1, \ldots, F_n, \ldots, F_N\}$, where $F_n$ represents an amount of traffic for one flow (e.g., measured in units of megabits per second (Mbps)), (N+1) indicates a number of the traffic flows, and n is an integer between 0 and N.

Functions or network applications running in the middlebox. The functions may be denoted as A in the form of $\{A_0, A_1, \ldots, A_p, \ldots, A_P\}$, where $A_p$ represents one of the functions, (P+1) indicates a number of the functions, and p is an integer between 0 and P.

Resource types (e.g., CPU, memory, or network bandwidth). The resource types may be denoted as R in the form of $\{R_0, R_1, \ldots, R_x, \ldots, R_X\}$, where $R_x$ represents an amount of resource in one type, (X+1) indicates a number of the resource types, and x is an integer between 0 and X.

Amount of resources per core in each resource type. For example, the resource type is CPU, which may have multiple cores each with a specific amount of resource (e.g., measured in gigahertz). The amount of resources per type may be denoted as $R_x$ (i.e., for type x) in the form of $\{R_{x0}, R_{x1}, \ldots, R_{xz}, \ldots, R_{xZ}\}$, where $R_{xz}$ represents one of the cores, (X+1) indicates a number of cores, and x is an integer between 0 and X.

Amount of resources needed for a function to process a fixed unit (e.g., measured in Mbps) of traffic flow. For example, for a function $A_p$, the amount of resource needed for $A_p$ to process 1 Mbps of flow may be denoted as $\{J*R_0, K*R_1, \ldots, L*R_X\}$, where J, K, and L are fractional numbers between 0 and 1.

A set of applications the traffic flows have to go through. For example, as provided by the output of a controller, a traffic flow may go through multiple functions in a pre-determined order, such as $A_0, A_2, A_1, A_3$.

Figure 3:
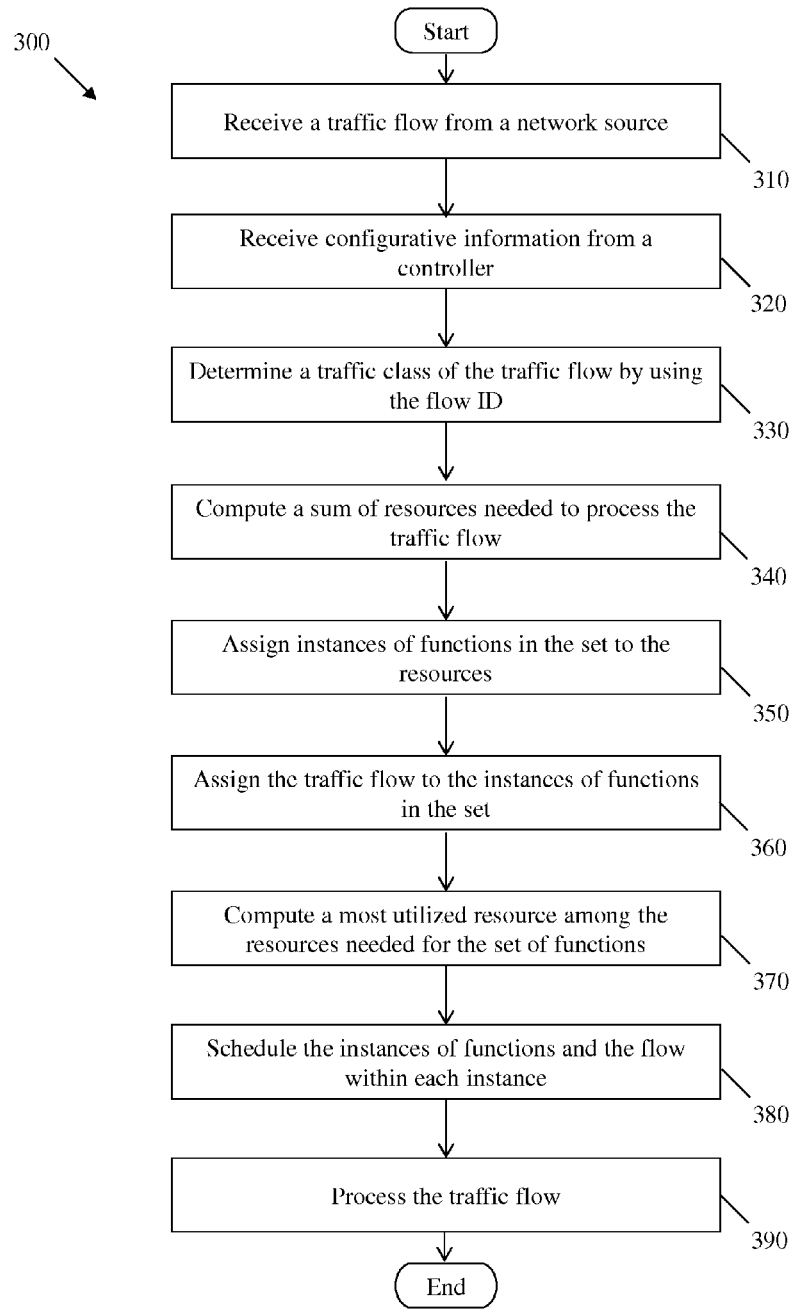
FIG. 3 is a flowchart of an embodiment of a packet processing method.

FIG. 3 illustrates an embodiment of a packet processing method 300, which may be implemented by a middlebox (e.g., the middlebox 120). The method 300 receive, process and forward traffic flows, and may use input information to a PEL. The method 300 may start in step 310, where a traffic flow comprising a plurality of packets may be received from a network source (e.g., the Internet). In use, multiple traffic flows may be received by the middlebox, and one traffic flow is described here to illustrate principles of this disclosure. In step 320, configuration information may be received from a controller (e.g., the controller 110). The configuration information is the output of the controller, and may include a table specifying a flow ID, a set of functions and an order of the set, and resource constraints. In step 330, a processor in the middlebox may determine a traffic class of the traffic flow by using the flow ID. In step 340, the processor may compute or calculate a sum of one or more resources needed to process the traffic flow based on the set of functions and resource requirements of each function. Then, the processor may assign the traffic flow to one or more resources, or in other words, allocate the one or more resources for the traffic flow. Specifically, in step 350, the processor may assign an instance of a first function or network application to a first resource, wherein the first function belongs to the set of functions, and the first resource belongs to the one or more resources. The instance of a function, sometimes also referred to as a process, may indicate one execution or operation of the function. Note that assigning the instance of the first function to a first resource does not indicate that the first function is limited to the first resource, as the first function may also be assigned to a second resource, a third resource, and so forth. In step 360, the processor may assign the traffic flow to the instance of the first function. Note that the traffic flow may be assigned to an instance of a second function, a third function, etc., in the set of functions. Further, the processor is capable of ensuring that no resource is assigned more instances of functions than what they can cope with (i.e., resource constraints).

In step 370, the processor may compute a most utilized resource among multiple resources needed for the set of functions based on input information of a PEL. In step 380, the processor may determine a processing schedule for the traffic flow. Specifically, the instances of functions and the traffic flow in each instance of function may be scheduled. For example, the processor may schedule when to execute the instance of the first function using the first resource (and other resources if needed) and when to process the traffic flow by the instance of the first function. Likewise, the processor may further schedule when to execute the instance of the second function using the second resource (and other resources if needed) and when to further process the traffic flow (already processed by the first function) by the instance of the second function. Scheduling may be based on the most utilized resource obtained in the preceding step. In an embodiment, a traffic flow may be scheduled in proportion to its requirements of the most utilized resource. For example, at every X (X is a positive integer) scheduling steps, a scheduler implemented by the processor may regularly determine which hardware resource is the most utilized, determine every flow's requirement of this resource, and schedule the flows in a way that fulfills requirements of fair scheduling of this most utilized resource. That is, the scheduler may schedule flows when they have shares to use of the resource, and may unschedule them when they run out of shares of the resource. Alternatively, scheduling may be carried out based on other factors, in which case step 370 may be modified or skipped. Further, scheduling may use various algorithms, such as a time-slice-based algorithm, a run-to-completion algorithm, or a combination of the two. In the time-slice-based algorithm, a scheduler implemented by the processor may run once every time slice to choose a next instance of function to execute. Time slice, or quantum, may refer to a period of time for which the instance is allowed to run without potential preempting. Run-to-completion algorithm may be a scheduling model in which each function may run until it either finishes, or explicitly yields control back to the scheduler. In addition, a PEL (e.g., the PEL 230), which may be part of the processor, may be the module implementing steps 330-380.

In step 390, the processor may process the traffic flow by the set of functions, following the order of the set, using the one or more resources, and according to the processing schedule. It should be understood that the method 300 may include only a portion of all necessary steps in handling a traffic flow. Thus, other steps or aspects, such as a detailed procedure of each function, queuing the traffic flow, forwarding the processed traffic flow to another network node, may be incorporated into the method 300 wherever appropriate. Further, one skilled in the art will recognize that, in use, the middlebox may receive a plurality of traffic flows potentially belonging to different classes. Some or all of the steps described in the method 300 may be repeated for each traffic flow the middlebox receives. Moreover, execution order of the steps in the method 300 may be flexible, provided that one step does not depend on result(s) produced by its preceding step. Certain steps may be combined, modified, or skipped.

Figure 4:
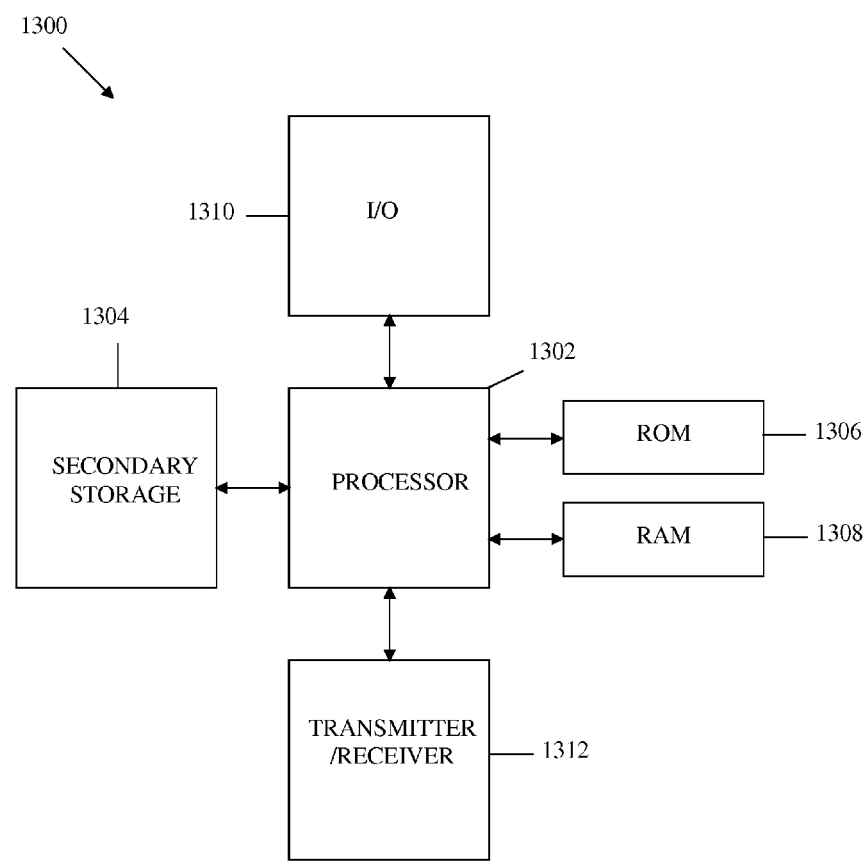
FIG. 4 is a schematic diagram of an embodiment of a network node.

The schemes described above may be implemented on a network component, such as a computer or network component with sufficient processing power, memory resources, and network throughput capability to handle the necessary workload placed upon it. FIG. 4 illustrates an embodiment of a network component or node 1300 suitable for implementing one or more embodiments of the methods and schemes disclosed herein, such as the packet processing scheme 200 and the packet processing method 300. Further, the network node 1300 may be configured to implement any of the apparatuses described herein, such as the controller 110 and the middlebox 120 (referred to as a service router if including a routing function).

The network node 1300 includes a processor 1302 that is in communication with memory devices including secondary storage 1304, read only memory (ROM) 1306, random access memory (RAM) 1308, input/output (I/O) devices 1310, and transmitter/receiver 1312. Although illustrated as a single processor, the processor 1302 is not so limited and may comprise multiple processors. The processor 1302 may be implemented as one or more central processor unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 1302 may be configured to implement any of the schemes described herein, including the packet processing scheme 200 and the packet processing method 300. The processor 1302 may be implemented using hardware or a combination of hardware and software.

The secondary storage 1304 is typically comprised of one or more disk drives or tape drives and is used for non-volatile storage of data and as an over-flow data storage device if the RAM 1308 is not large enough to hold all working data. The secondary storage 1304 may be used to store programs that are loaded into the RAM 1308 when such programs are selected for execution. The ROM 1306 is used to store instructions and perhaps data that are read during program execution. The ROM 1306 is a non-volatile memory device that typically has a small memory capacity relative to the larger memory capacity of the secondary storage 1304. The RAM 1308 is used to store volatile data and perhaps to store instructions. Access to both the ROM 1306 and the RAM 1308 is typically faster than to the secondary storage 1304.

The transmitter/receiver 1312 may serve as an output and/or input device of the network node 1300. For example, if the transmitter/receiver 1312 is acting as a transmitter, it may transmit data out of the network node 1300. If the transmitter/receiver 1312 is acting as a receiver, it may receive data into the network node 1300. The transmitter/receiver 1312 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transmitter/receiver 1312 may enable the processor 1302 to communicate with an Internet or one or more intranets. I/O devices 1310 may include a video monitor, liquid crystal display (LCD), touch screen display, or other type of video display for displaying video, and may also include a video recording device for capturing video. I/O devices 1310 may also include one or more keyboards, mice, or track balls, or other well-known input devices.

It is understood that by programming and/or loading executable instructions onto the network node 1300, at least one of the processor 1302, the secondary storage 1304, the RAM 1308, and the ROM 1306 are changed, transforming the network node 1300 in part into a particular machine or apparatus (e.g., a middlebox or service router having the novel functionality taught by the present disclosure). The executable instructions may be stored on the secondary storage 1304, the ROM 1306, and/or the RAM 1308 and loaded into the processor 1302 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   at least one receiver configured to:
      receive a traffic flow;
      receive information comprising a set of functions and an order of the set from a controller and a flow identification (ID) assigned by the controller, wherein the set of functions comprises a first function, wherein the flow ID assigned by the controller is used to determine a traffic class of the traffic flow, and received separately from the traffic flow provided by a network source; and
   a processor coupled to the at least one receiver and configured to:
      assign the traffic flow to one or more resources including a first resource by assigning an instance of the first function to the first resource and assigning the traffic flow to the instance of the first function;
      determine a processing schedule for the traffic flow by scheduling when to execute the instance of the first function using the first resource, scheduling when to process the traffic flow by the instance of the first function, and using a time-slice-based algorithm, a run-to-completion algorithm, or both;
      process the traffic flow by the set of functions in accordance with the traffic class determined from the flow ID, following the order of the set, using the one or more resources, and according to the processing schedule; and
      compute a sum of the one or more resources based on the set of functions, wherein assigning the traffic flow is based on the sum.

2. An apparatus comprising:
   at least one receiver configured to:
      receive a traffic flow;
      receive information comprising a set of functions and an order of the set from a controller and a flow identification (ID) assigned by the controller, wherein the flow ID assigned by the controller is received separately from the traffic flow; and
   a processor coupled to the at least one receiver and configured to:
      assign the traffic flow to one or more resources; and
      determine a processing schedule for the traffic flow;
      process the traffic flow by the set of functions, following the order of the set, using the one or more resources, and according to the processing schedule;
      compute a sum of the one or more resources based on the set of functions, wherein assigning the traffic flow is based on the sum; and
   determine a most utilized hardware resource in the one or more resources, wherein determining the processing schedule is based on the most utilized hardware resource,
   wherein the set of functions comprises a first function, wherein the one or more resources comprises a first resource, and wherein assigning the traffic flow comprises:
      assigning an instance of the first function to the first resource; and
      assigning the traffic flow to the instance of the first function.

3. The apparatus of claim 1, wherein the processor is further configured to, before computing a total amount of the one or more resources, determine a traffic class of the traffic flow using the flow ID.

4. The apparatus of claim 1, wherein the set of functions further comprises a second function, wherein the second function trails the first function in the order of the set, wherein the one or more resources further comprises a second resource, wherein assigning the traffic flow further comprises:
   assigning an instance of the second function to the second resource; and
   assigning the traffic flow to the instance of the second function, and
wherein processing the traffic flow comprises:
   processing the traffic flow by the first function and using the first resource;
   directing the processed traffic flow to the second function; and
   processing the processed traffic flow by the second function and using the second resource.

5. The apparatus of claim 1, wherein the set of functions comprises packet tagging, packet forwarding, packet routing, firewall, intrusion detection, intrusion prevention, encryption, decryption, load balancing, wide area network (WAN) optimization, proxy, and combinations thereof.

6. The apparatus of claim 1, wherein the processor is further configured to ensure no resource is overloaded when assigning the traffic flow to the one or more resources.

7. A method comprising:
receiving a traffic flow and configuration information from a controller, wherein the configuration information comprises a flow identification (ID) assigned by the controller, a set of functions including a first function and a second function, and an order of the set where the second function trails the first function, wherein the flow ID assigned by the controller is used to determine a traffic class of the traffic flow, and received independently from the traffic flow provided by a network source;
assigning the traffic flow to one or more resources including a first resource and a second resource, wherein assigning the traffic flow comprises assigning an instance of the first function to the first resource, assigning the traffic flow to the instance of the first function, assigning an instance of the second function to the second resource, and assigning the traffic flow to the instance of the second function;
determining a processing schedule for the traffic flow; and
processing the traffic flow by the set of functions in accordance with the traffic class determined from the flow ID, following the order of the set, using the one or more resources, and according to the processing schedule, wherein processing the traffic flow comprises processing the traffic flow by the first function and using the first resource, directing the processed traffic flow to the second function, and processing the processed traffic flow by the second function and using the second resource.

8. The method of claim 7, further comprising computing a sum of the one or more resources based on the set of functions, wherein assigning the traffic flow is based on the sum.

9. The method of claim 8, wherein determining the processing schedule comprises:
scheduling when to execute the instance of the first function using the first resource; and
scheduling when to process the traffic flow by the instance of the first function.

10. A method comprising:
receiving a traffic flow and configuration information from a controller, wherein the configuration information comprises a flow identification (ID) assigned by the controller, a set of functions, and an order of the set, wherein the flow ID assigned by the controller is received independently from the traffic flow;
assigning the traffic flow to one or more resources;
determining a processing schedule for the traffic flow;
processing the traffic flow by the set of functions, following the order of the set, using the one or more resources, and according to the processing schedule;
computing a sum of the one or more resources based on the set of functions, wherein assigning the traffic flow is based on the sum; and
determining a most utilized hardware resource in the one or more resources, wherein determining the processing schedule is based on the most utilized hardware resource,
wherein the set of functions comprises a first function, wherein the one or more resources comprises a first resource, and wherein assigning the traffic flow comprises:
assigning an instance of the first function to the first resource; and
assigning the traffic flow to the instance of the first function.

11. The method of claim 9, wherein determining the processing schedule comprising using a time-slice-based algorithm, a run-to-completion algorithm, or both.

12. The method of claim 7, further comprising:
ensuring no resource is overloaded when assigning the traffic flow to the one or more resources.

13. A middlebox comprising:
at least one receiver configured to:
receive a plurality of packets from a network source;
receive information comprising a set of functions and an order of the set of functions from a controller and a flow identification (ID) assigned by the controller, wherein the set of functions includes a first function and a second function, wherein the second function trails the first function in the order of the set, wherein the flow ID is used to determine a traffic class of the packets in a traffic flow, and provided separate from the traffic flow provided by a network source; and
a processor implementing a local coordinator, wherein the local coordinator is configured to:
compute a sum of resource needed for the plurality of packets based on the set of functions;
allocate at least one hardware resource including a first resource and a second resource based on the sum by assigning an instance of the first function to the first resource and an instance of the second function to the second resource and assigning the traffic flow to the instances of the first and second functions;
determine a processing schedule; and
process the plurality of packets by the set of functions in accordance with the traffic class determined from the flow ID, following the order of the set, using the at least one hardware resource, and according to the processing schedule, wherein processing the plurality of packets comprises processing the plurality of packets by the first function and using the first resource, steering the processed packets to the second function, and processing the processed packets by the second function and using the second resource.

* * * * *